United States Patent
Ota

(10) Patent No.: US 12,106,403 B2
(45) Date of Patent: Oct. 1, 2024

(54) CENTER SHIFT AMOUNT ESTIMATING APPARATUS, METHOD, AND PROGRAM

(71) Applicant: Rigaku Corporation, Tokyo (JP)

(72) Inventor: Takumi Ota, Tokyo (JP)

(73) Assignee: Rigaku Corporation, Tokyo (JP)

( * ) Notice: Subject to any disclaimer, the term of this patent is extended or adjusted under 35 U.S.C. 154(b) by 334 days.

(21) Appl. No.: 17/558,677

(22) Filed: Dec. 22, 2021

(65) Prior Publication Data

US 2022/0198724 A1    Jun. 23, 2022

(30) Foreign Application Priority Data

Dec. 22, 2020  (JP) .................................. 2020-212927

(51) Int. Cl.
| | | |
|---|---|---|
| *G06T 11/00* | (2006.01) | |
| *G06T 11/20* | (2006.01) | |
| *G06V 10/25* | (2022.01) | |

(52) U.S. Cl.
CPC .......... *G06T 11/005* (2013.01); *G06T 11/206* (2013.01); *G06V 10/25* (2022.01); *G06F 2218/12* (2023.01)

(58) Field of Classification Search
CPC ................. G06T 11/005; G06T 11/206; G06T 2207/10081; G06V 10/25; G06F 2218/12
See application file for complete search history.

(56) References Cited

U.S. PATENT DOCUMENTS

| | | | | |
|---|---|---|---|---|
| 2016/0143606 A1* | 5/2016 | Yamakawa | ............ | A61B 6/032 378/19 |
| 2021/0142505 A1* | 5/2021 | Nikolskiy | ................. | G06T 7/70 |

FOREIGN PATENT DOCUMENTS

| | | | | | |
|---|---|---|---|---|---|
| CN | 104574292 A | * | 4/2015 | ............ | A61B 6/032 |
| CN | 105844594 A | * | 8/2016 | | |
| CN | 106651977 A | * | 5/2017 | ............ | G01N 23/04 |
| JP | H0862159 A | * | 3/1996 | | |
| JP | 2006288719 A | * | 10/2006 | ............ | A61B 6/032 |
| WO | WO-2018008363 A1 | * | 1/2018 | ............ | A61B 6/032 |

OTHER PUBLICATIONS

Cheng, CC., Ching, YT., Ko, PH. et al. Correction of center of rotation and projection angle in synchrotron X-ray computed tomography. 2018, Sci Rep 8, 9884 (2018). https://doi.org/10.1038/s41598-018-28149-8 (Year: 2018).*

(Continued)

*Primary Examiner* — Vu Le
*Assistant Examiner* — Jack Peter Kraynak
(74) *Attorney, Agent, or Firm* — ASLAN LAW, P.C.

(57) ABSTRACT

A center shift amount estimating apparatus for estimating a deviation between a rotation axis of the sample and a center of a detector with respect to an X-ray source in a CT device, comprises a region specifying unit for specifying a region of interest in a reconstructed uncorrected image to avoid an area where there is an extremely different pixel value from the surrounding area, a temporary correction unit for correcting an assumed center shift amount to reconstruct a temporarily corrected image with respect to the region of interest, an index analyzing unit for searching an extreme value of an index representing variation of pixel values in the temporarily corrected image, and a center shift amount specifying unit for specifying an actual center shift amount with respect to the extreme value.

10 Claims, 14 Drawing Sheets

(56) References Cited

OTHER PUBLICATIONS

C-C. Cheng et al., "Correction of center of rotation and projection angle in synchrotron Xray computed tomography", Scientific Reports vol. 8, Article No. 9884 Jun. 29, 2018, 9 pages. Online: https://www.nature.com/articles/s41598-018-28149-8.
JP Office Action issued in JP Application No. 2020-212927, JPO, Japan, Jan. 9, 2024, 3 pages.
EPO, EP Search Report issued in EP Application No. 21 216 197.0, Munich Germany, Apr. 29, 2022, 12 pages.

\* cited by examiner

# CENTER SHIFT AMOUNT ESTIMATING APPARATUS, METHOD, AND PROGRAM

CROSS-REFERENCE TO RELATED APPLICATIONS

This application claims priority to JP Patent Application No. 2020-212927 filed on Dec. 22, 2020, the entire contents of which are hereby incorporated by reference.

RELATED ART

Field of the Invention

The present invention relates to a center shift amount estimating apparatus, a method, and a program for estimating a deviation of a rotation axis of a CT device.

Description of the Related Art

The CT device reconstructs a three-dimensional image from a plurality of projected images acquired while rotating a sample or a gantry. At that time, if the rotation axis of the sample deviates from the center of the detector with respect to the X-ray source (center shift), the quality of the reconstructed image is deteriorated as compared with the ideal image without center shift.

To cancel such center shift, conventionally, a method of estimating the center shift amount to correct it has been considered. For example, in the technique described in Non-Patent Document 1, a synchrotron collimated beam is used to measure the center shift amount by scanning 180 degrees, and the total variation (TV) is used as an index for estimating the center shift amount.

Non-Patent Document

Non-Patent Document 1: "Correction of center of rotation and projection angle in synchrotron X-ray computed tomography", C-C. Cheng et al., Scientific Reports volume 8, Article number: 9884 (2018), https://www.nature.com/articles/s41598-018-28149-8

However, in such a case where a part of the sample is made of metal, since the variation of the pixel value becomes large at the boundary position of the reconstructed image of the part, the total variation does not always increase or decrease in accordance with the center shift amount.

SUMMARY OF THE INVENTION

The present invention has been achieved in view of such circumstances, and an object thereof is to provide a center shift amount estimating apparatus, a method and a program capable of accurately identifying the center shift amount by using an image area avoiding a region where a pixel value is extremely different from the surrounding even if there is such a region.

(1) In order to achieve the above object, the center shift amount estimating apparatus of the present invention is a center shift amount estimating apparatus for estimating a deviation between a rotation axis of a sample and a center of a detector with respect to an X-ray source in a CT device, and the apparatus comprises: a region specifying unit for specifying a region of interest in a reconstructed uncorrected image; a temporary correction unit for correcting an assumed center shift amount to reconstruct a temporarily corrected image with respect to the region of interest; an index analyzing unit for searching an extreme value of an index representing variation of pixel values in the temporarily corrected image; and a center shift amount specifying unit for specifying an actual center shift amount with respect to the extreme value.

Thus, by specifying the actual center shift amount using the region of interest identified in the uncorrected image, it is possible to accurately specify the center shift amount with using an image area avoiding an area where pixel values are extremely different from the surrounding, for example, a region in which a metal is imaged.

(2) Further, in the center shift amount estimating apparatus of the present invention, the region specifying unit specifies the region of interest based on a user specification. Thus, the user can optionally specify the image area as the determination material.

(3) Further, in the center shift amount estimating apparatus of the present invention, the region of interest is a two-dimensional region on a cross section perpendicular to the rotation axis. Thus, it becomes possible to easily and effectively specify the region of interest.

(4) Further, the center shift amount estimating apparatus of the present invention further comprises a method determination unit for determining a scanning method of the CT device, and the index analyzing unit searches for a maximal value or a minimal value of the index according to the determined scanning method. Thus, it is possible to search the maximal value and the minimal value according to respectively a 360° scan and a 180° scan.

(5) Further, in the center shift amount estimating apparatus of the present invention, the method determination unit determines the scanning method of the CT device from information received from the CT device. Thus, it is possible to easily and reliably determine the scanning method.

(6) Further, in the center shift amount estimating apparatus of the present invention, the index analyzing unit performs statistical processing or shape determination on a plot of the index with respect to the assumed center shift amount. Thus, when certain trends may not be obtained due to, for example, insufficient exposure time, noise, or insufficient selection of a region of interest, it is possible to prompt correction of them.

(7) Further, the center shift amount estimating apparatus of the present invention comprises a plot outputting unit for outputting a plot of the index with respect to the assumed center shift amount. Thus, the user can check the plot to determine whether or not the search for the extreme value is appropriate, and can take necessary measures.

(8) Further, the center shift amount estimating apparatus of the present invention further comprises a correction unit for correcting the actual center shift amount to reconstruct the corrected image. Thus, it is possible to obtain a reconstructed image from which artifacts caused by the center shift are removed.

(9) Further, the method of the present invention is a center shift amount estimating method for estimating a deviation between a rotation axis of a sample and a center of a detector with respect to an X-ray source in a CT device, the method comprising the steps of: specifying a region of interest in a reconstructed uncorrected image; correcting an assumed center shift amount to reconstruct a temporarily corrected image with respect to the region of interest; searching an extreme value of an index representing variation of pixel values in the temporarily corrected image; and specifying an actual center shift amount with respect to the extreme value. Thus, it is possible to specify the center shift amount accurately using the image area avoiding a region where pixel values are extremely different even if there is such a region.

(10) Further, the program of the present invention is a center shift amount estimating program for estimating a deviation between a rotation axis of a sample and a center of a detector with respect to an X-ray source in a CT device, and causes a computer to execute the processes of: specifying a region of interest in a reconstructed uncorrected image; correcting an assumed center shift amount to reconstruct a temporarily corrected image with respect to the region of interest; searching an extreme value of an index representing variation of pixel values in the temporarily corrected image; and specifying an actual center shift amount with respect to the extreme value. Thus, it is possible to accurately specify the center shift amount by using the image area avoiding a region where pixel values are extremely different even if there is such a region.

According to the present invention, it is possible to accurately specify the center shift amount by using the image area avoiding a region where pixel values are extremely different from the surrounding even if there is such a region.

DETAILED DESCRIPTION OF THE INVENTION

Figure 1:
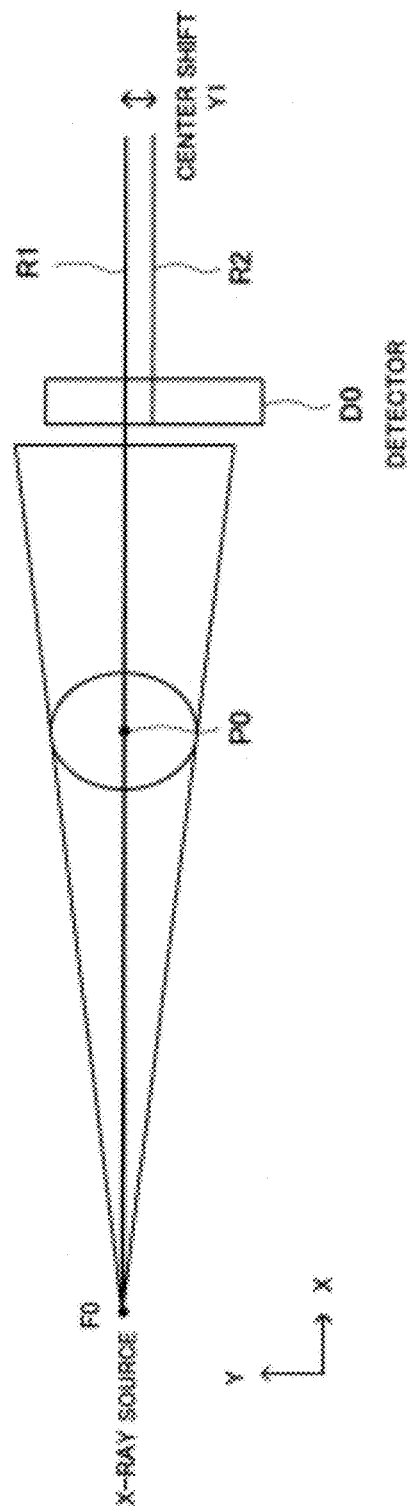
FIG. 1 is a schematic diagram showing a configuration of a CT device in which a center shift has occurred.

Next, embodiments of the present invention are described with reference to the drawings. To facilitate understanding of the description, the same reference numerals are assigned to the same components in the respective drawings, and duplicate descriptions are omitted.

[Principle]

A CT device irradiates a sample with a cone-shaped or parallel beam of X-rays from all angles, and acquires a distribution of the absorption coefficient of the X-rays, that is, a projected image, by a detector. To irradiate X-rays from any angles, the CT device is configured to rotate the sample stage with respect to the fixed X-ray source and the detector or the gantry integrated with the X-ray source and the detector.

Thus, the distribution of the linear absorption coefficient f of the sample can be inferred from the contrast of the projected image of the sample obtained by performing projection from various angles. Then, it is called reconstruction that a three-dimensional line absorption coefficient distribution is obtained from two-dimensional projected images. Basically, backprojection of the projected images is performed.

In the CT device as described above, adjustment is performed so that the rotation center of the sample or the gantry is positioned on a straight line connecting the center of the X-ray source and the center of the detector. Misalignment of the center of rotation (center shift) from the straight line connecting the center of the source and the detector deteriorates the reconstructed image. FIG. 1 is a schematic diagram showing the configuration of a CT device where a center shift occurs, with a view of the configuration in the rotation axis direction. A center shift Y1 occurs between the straight line R1 connecting the X-ray source F0 with the rotation axis P0 and the center line R2 of the detector D0.

Figure 2A:
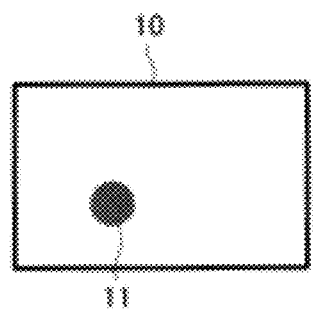
FIGS. 2A and 2B are exemplary schematic diagrams showing reconstructed images of 180° scanning measurements respectively in the absence and presence of center shift.
Figure 2B:
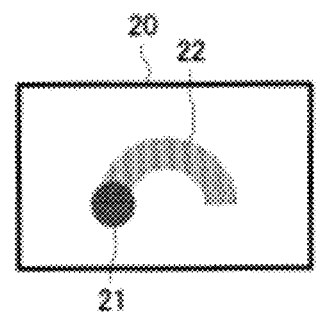

FIGS. 2A and 2B are exemplary schematic diagrams of reconstructed images of 180° scanning measurements respectively in the absence and presence of center shift. For example, for the CT device 200, nano3DX (registered trade mark) produced by Rigaku corporation can be used. In devices that use parallel-beams, such as nano3DX, measures are performed by 180° scanning. An image 11 of a characteristic structure such as a point appears in the reconstructed image 10 when there is no center shift, while a semicircular artifact 22 appears in addition to the image 21 of the characteristic structure in the reconstructed image 20 when there is a center shift.

Figure 3A:
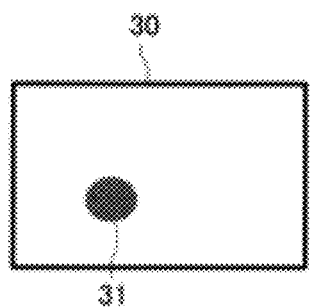
FIGS. 3A and 3B are exemplary schematic diagrams showing reconstructed images of 360° scanning measurements respectively in the absence and presence of center shift.
Figure 3B:
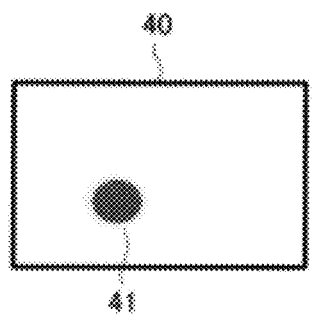

FIGS. 3A and 3B are exemplary schematic diagrams of reconstructed images of 360° scanning measurements respectively in the absence and presence of center shift. For example, for the CT device 200, CTLabHX made by Rigaku corporation can be used. With devices using cone beams, such as CTLabHX, 360° scanning measurement is performed. The image 31 of the characteristic structure appears in the reconstructed image 30 when there is no center shift, however, the image 41 of the characteristic structure is blurred as a whole in the reconstructed image 40 when there is a center shift.

In the present invention, an index for quantitatively evaluating the degree of deterioration of an image is introduced, and the center shift amount is automatically and uniformly calculated. Specifically, an index for quantitatively evaluating the degree of deterioration of the reconstructed image is calculated. The value is calculated for the center shift amount of the search range, and the center shift amount when it takes the extreme value is searched. Thus, it is possible to obtain an image in which blurring and artifacts are reduced. As the index, for example, an index using differentiation such as total variation (Total Variation, TV) can be cited. Further, sharpness may be used as an index using the standard deviation value of the image.

The calculation of the total variation is performed by summing the differential values at each pixel in the region with respect to the region of interest of the image f(x, y) of a z-section as shown in Equation (1). When a plurality of images are specified in the z-direction, the average value thereof is used.

$$TV = \int dxdy \sqrt{\left(\frac{\partial f}{\partial x}\right)^2 + \left(\frac{\partial f}{\partial y}\right)^2} \quad (1)$$

Figure 4:
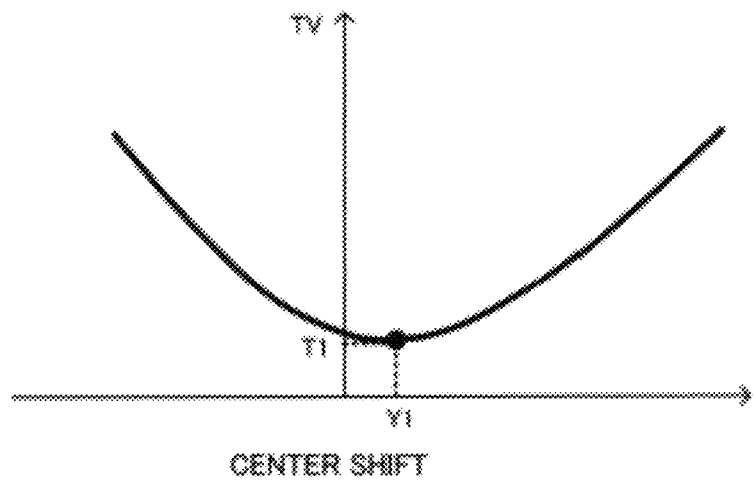
FIG. 4 is a graph showing the relationship between the center shift amount and the total variation in 180° scanning measurement.

FIG. 4 is a graph showing the relationship between the center shift amount and the total variation in 180° scanning measurement. In the case of a 180° scanning CT machine, semicircular artifacts should increase the total variation of the image. The change in the total variation when the detector is virtually shifted by numerical calculations can be obtained, and it can be inferred that the center shift Y1 giving the minimal value T1 is the center shift amount at the time of the measurement.

Figure 5:
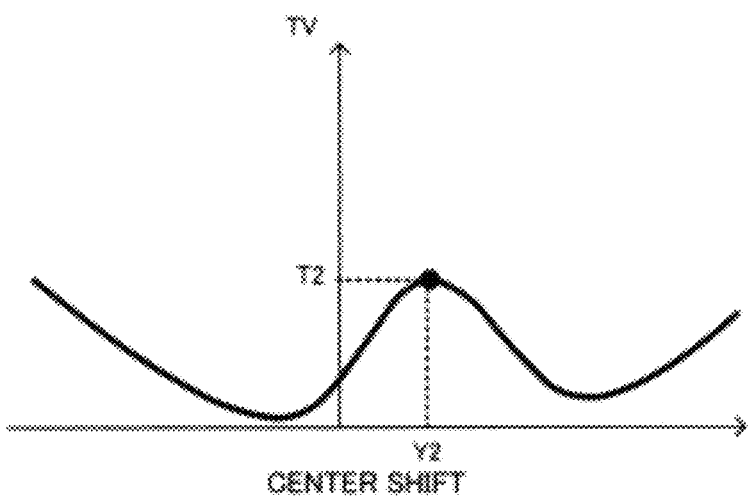
FIG. 5 is a graph showing the relationship between the center shift amount and the total variation in 360° scanning measurement.

FIG. 5 is a graph showing the relationship between the center shift amount and the total variation in 360° scanning measurement. In the CT device for a 360° scan, the total variation should be small if the image is blurred. The change in the total variation when the detector is virtually shifted is obtained by numerical calculation, and it can be inferred that the center shift Y2 giving the maximal value T2 is the center shift amount at the time of the measurement.

[Whole System]

Figure 6:
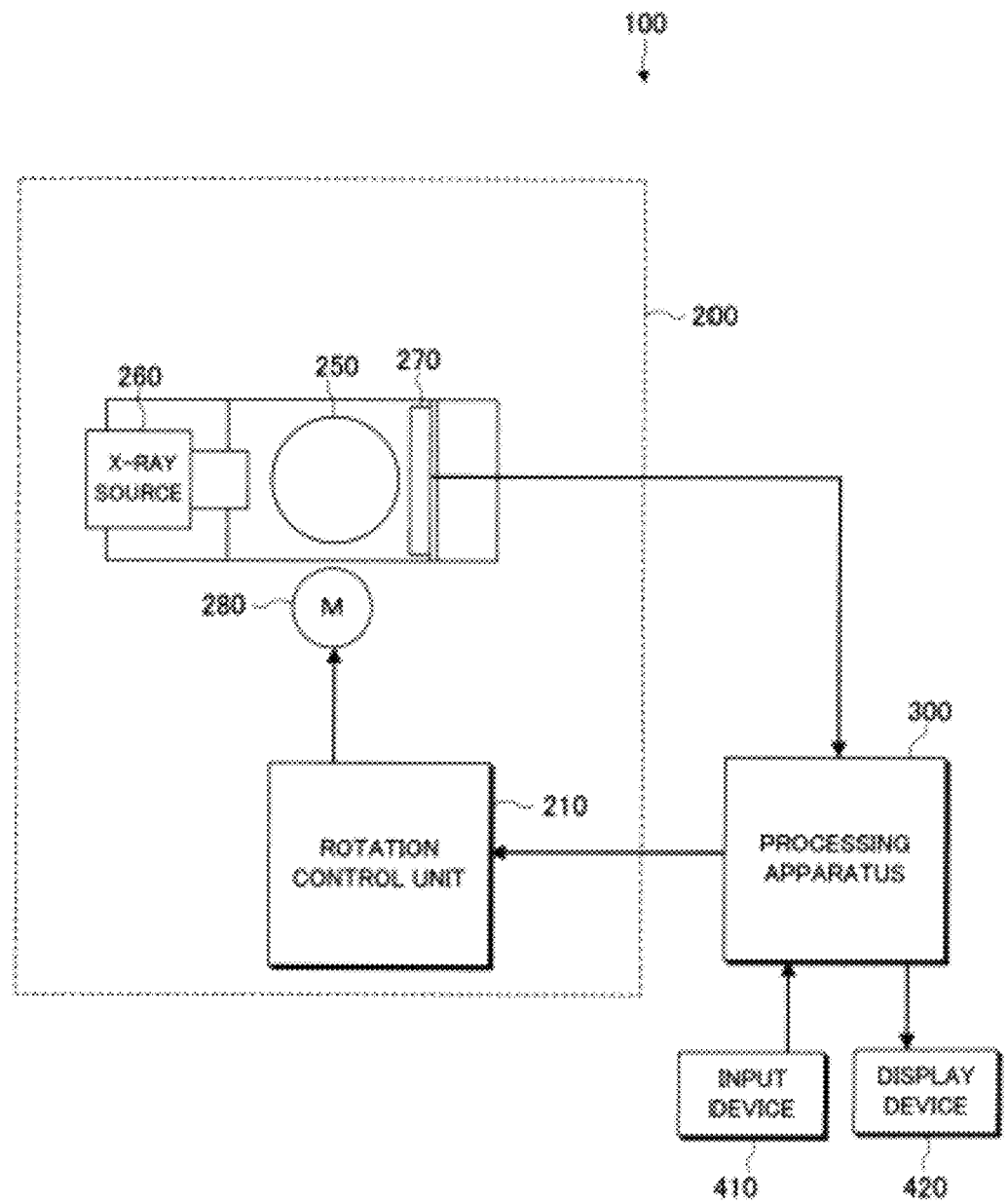
FIG. 6 is a schematic diagram showing the configuration of the entire system.

FIG. 6 is a schematic diagram showing a configuration of a whole system 100 including a CT device 200 and a processing apparatus 300 connected thereto, an input device 410, and a display device 420. Here, the CT device 200 shown in FIG. 6 is configured to rotate the sample with respect to the X-ray source 260 and the detector 270, however, is not limited thereto, and may be configured to rotate a gantry in which the X-ray source and the detector are integrated.

The processing apparatus 300 is connected to the CT device 200, and controls the CT device 200 and processes the acquired data. The processing apparatus 300 may be a PC terminal or a server on a cloud. The processing apparatus 300 estimates the deviation between the rotation axis with respect to the X-ray source and the center of the detector in the CT device. The input device 410 is, for example, a keyboard or a mouse, and performs input to the processing apparatus 300. Display device 420 is, for example, a display, and displays a projected image or a reconstructed image.

[CT Device]

As shown in FIG. 6, the CT device 200 includes a rotation control unit 210, a sample stage 250, an X-ray source 260, a detector 270 and a driving unit 280. X-ray CT is performed by rotating the sample stage 250 installed between the X-ray source 260 and the detector 270. Note that the X-ray source 260 and the detector 270 may be installed on a gantry (not shown), and the gantry may be rotated with respect to a sample fixed to the sample stage 250.

The CT device 200 drives the sample stage 250 at a timing instructed by the processing apparatus 300, and acquires a projected image of the sample. The measurement data is transmitted to the processing apparatus 300. The CT device 200 is suitable for use in precision industrial products such as semiconductor devices, however, can be applied to an apparatus for animals as well as an apparatus for industrial products.

The X-ray source 260 emits X-rays toward the detector 270. The detector 270 has a receiving surface for receiving X-rays, and can measure the intensity distribution of X-rays transmitted through the sample by a large number of pixels. The rotation control unit 210 rotates the sample stage 250 at a speed set at the time of CT measurement by the drive unit 280.

[Processing Apparatus]

Figure 7:
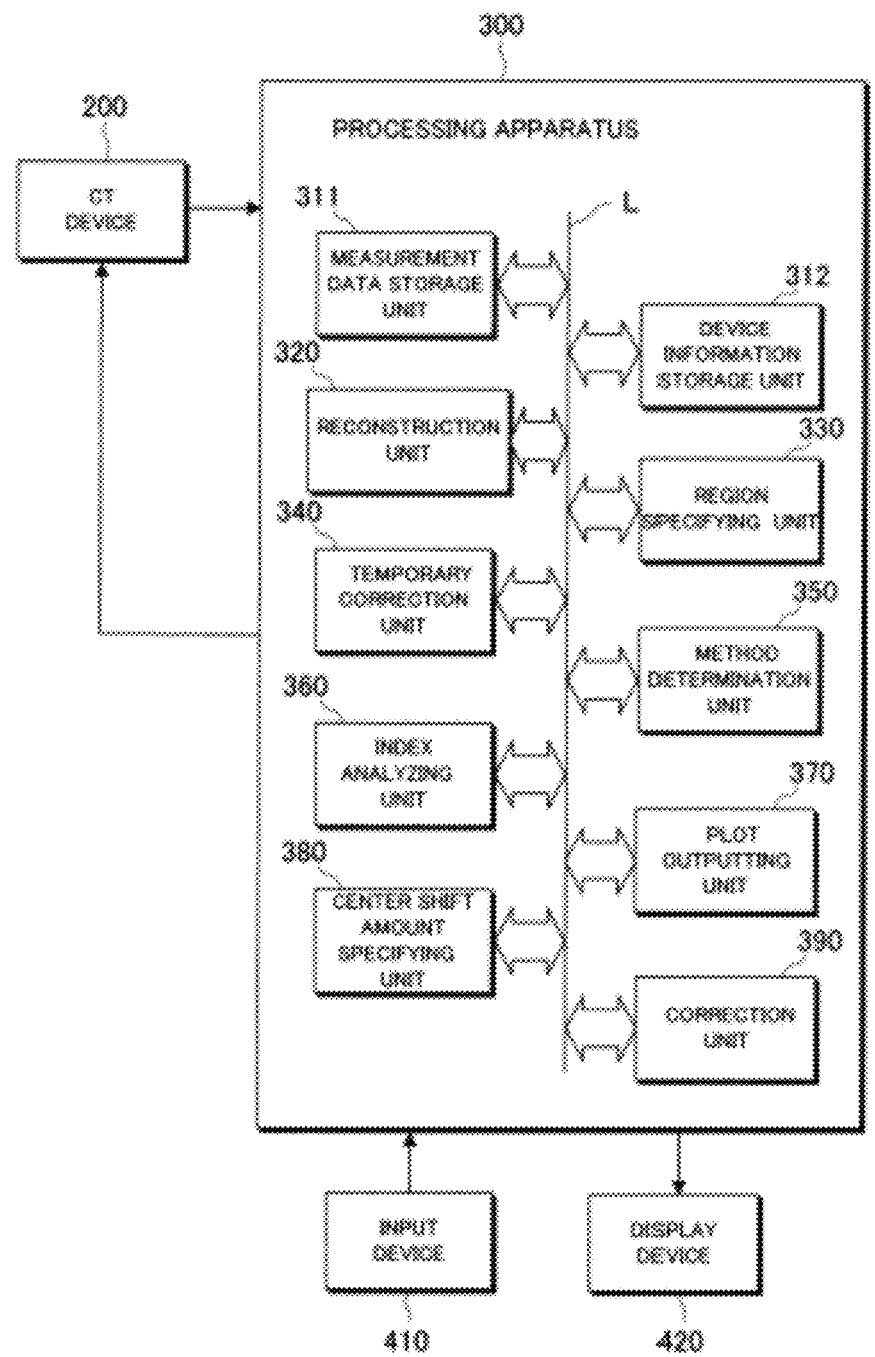
FIG. 7 is a block diagram showing a configuration of a center shift amount estimating apparatus (processing apparatus) according to the present invention.

FIG. 7 is a block diagram showing a configuration of a processing apparatus 300 (center shift amount estimating apparatus). The processing apparatus 300 is configured by a computer formed by connecting a CPU (Central Processing Unit), a ROM (Read Only Memory), a RAM (Random Access Memory), and a memory to a bus. The processing apparatus 300 is connected to the CT device 200 and receives information.

The processing apparatus 300 comprises a measurement data storage unit 311, a device information storage unit 312, a reconstruction unit 320, a region specifying unit 330, the temporary correction unit 340, a method determination unit 350, an index analyzing unit 360, a plot outputting unit 370, a center shift amount specifying unit 380 and a correction unit 390. Each unit can transmit and receive information via the control bus L. The input device 410 and the display device 420 are connected to the CPU via an appropriate interface.

The measurement data storage unit 311 stores measurement data acquired from the CT device 200. The measurement data include rotation angle information and corresponding projected images. The device information storage unit 312 stores device information acquired from the CT device 200. The device information includes device name, beam shape, geometry at the time of measurement, scanning method, etc. The reconstruction unit 320 reconstructs a three-dimensional image from the projected images for the reconstruction.

The region specifying unit 330 specifies a region of interest in the uncorrected image. The uncorrected image is an image reconstructed from the projected images. Preferably, the region specifying unit 330 specifies the region of interest based on the user specification. For example, a UI function that allows a region of interest to be set, such as specifying a rectangular region by mouse operation, is used.

This allows the user to optionally specify the image region as the determination material. It is preferable that the user sets the image region so as to include an area where the characteristic structure appears. For example, when an index value is calculated based on an image including an area where a point-like structure appears, noise is less and it is easy to search for extreme values. In addition, it is also preferable to set the region so as not to include an area of metal and an area where an artifact appears due to the metal. It is possible to reduce the adverse effect on the center shift correction by specifying an area where the absorption coefficient is extremely lowered to set a region so as to avoid the area.

The region of interest is preferably a two-dimensional region on a cross section perpendicular to the rotation axis. For the shape of the region of interest, an arbitrary shape may be specified and the size of the shape may be specified. Further, any number of coordinate points may be defined on the image. Thus, it is possible to easily and effectively specify the region of interest. However, it is not necessarily required to be a two-dimensional region on one cross section, and a plurality of z cross sections may be selected and a two-dimensional region may be set for each cross section.

The temporary correction unit 340 acquires the temporarily corrected image in the region of interest reconstructed from the projected images with correcting the assumed center shift. "Assumed" refers to changing the center shift in a gradual and trial manner to generate a plurality of corrected reconstructed images. Thus, by specifying the actual center shift amount using the region of interest specified in the uncorrected image, it is possible to accurately specify the center shift amount by using an image region avoiding the area where the pixel values are extremely different from the surrounding, for example, an area in which the metal is imaged.

The method determination unit 350 determines the scanning method of the CT device. The method determination unit 350 determines the scanning method of the CT device with the information received from the CT device. It is preferable to set whether to search the maximal value or the minimal value in relation to a beam shape or a projection angle range. Note that the scanning method may be determined in the scan angle range of the projected images for the subject. For example, a 0° to 160° scan may be dealt as a 180° scan. Thus, it is possible to easily and reliably determine the scanning method. In this way, automatic center correction is enabled for both 180° and 360° scans.

The index analyzing unit 360 calculates an index representing variation of pixel values in the temporarily corrected image, and searches for an extreme value of the index value with respect to the assumed center shift amount. Thus, it is possible to provide an index for quantitatively evaluating the degree of deterioration of the reconstructed image.

The index analyzing unit 360 automatically selects an extreme value search algorithm according to the determined scanning method, and searches for a maximal value or a minimal value of the index. In the case of a 180° scan using the parallel beam method, the minimal value is searched, and in the case of a 360° scan using the cone beam method, the maximal value is searched. As a result, it is possible to search for the minimal value and the maximal value in accordance with each of the 180° scan and the 360° scan by executing a single program. As a result, the center shift amount can be quantitatively estimated.

In parallel with the search for the extreme value, the index analyzing unit 360 performs statistical processing and shape determination on a plot of the index with respect to the assumed center shift amount. A profile fitting is performed on the plot of the index value with the assumed center shift amount by an appropriate function.

The plot outputting unit 370 outputs a plot of the index with respect to the assumed center shift amount. As a result, the user can check the plot to determine whether or not the search for the extreme value is appropriate, and can take necessary measures.

The center shift amount specifying unit 380 specifies the actual center shift amount with respect to the extreme value. That is, the center shift amount specifying unit 380 specifies the center shift amount when a specific extreme value corresponding to the scanning method is obtained.

The correction unit 390 corrects the actual center shift amount, and acquires a corrected image reconstructed from the projection images. Thus, it is possible to obtain a reconstructed image in which the artifacts caused by the center shift are removed. In the processing apparatus 300, both the functions of the estimation of the center shift amount and the setting of the region of interest according to the scanning method are not indispensable, and only one of them may be used.

[Measurement Method]

A sample is installed in the CT device 200, and projected images are acquired while the sample is irradiated with X-rays under predetermined conditions. The CT device 200 transmits the device information, such as a scanning method, and the acquired projected images as measurement data to the processing apparatus 300.

[Center Shift Amount Estimating Method]

Figure 8:
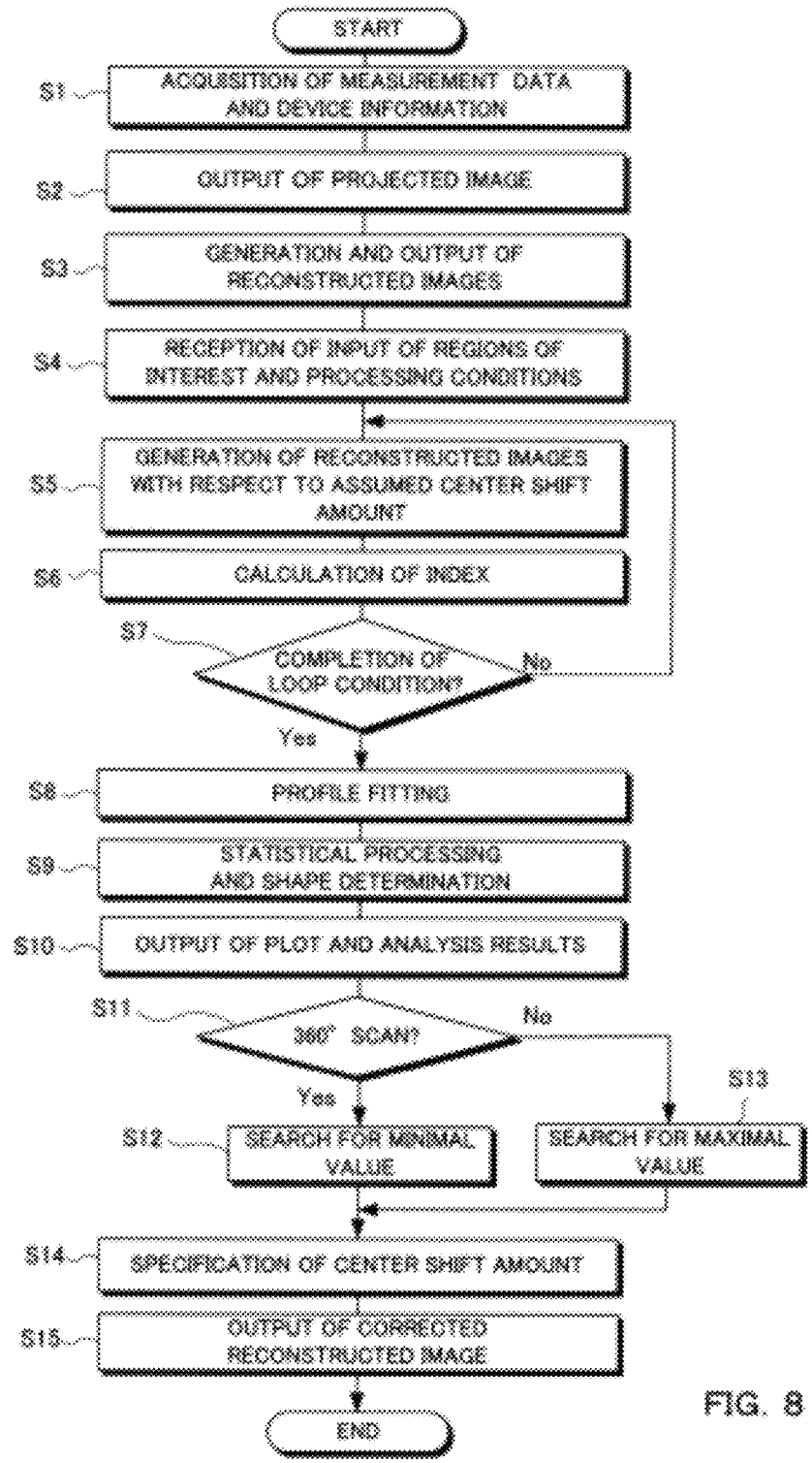
FIG. 8 is a flowchart showing the operation of the center shift amount estimating apparatus (processing apparatus) of the present invention.

FIG. 8 is a flowchart showing the operation of the processing apparatus 300 (center shift amount estimating apparatus). First, the processing apparatus 300 acquires measurement data and device information (step S1). Next, a projected image is output by using the obtained measurement data and device information (step S2), and a reconstructed image is generated and output (step S3).

The input of the processing conditions such as the setting of the region of interest by the user, the number of steps, the step width, and the like are received with respect to the output of the reconstructed image (step S4). Preferably, the region of interest is specified firstly on the Z component (parallel to the rotation axis) and secondly the XY component (perpendicular to the rotation axis). For the region of interest set in this manner, the index calculation loop is performed in accordance with the input processing conditions. The range of the center shift for being changed is a search range for an extreme value, and the width, step, and center position of the search range are determined in advance. For the center position, for example, by using projected images of θ=0° and 180° around the sample rotation axis, a value estimated from the residual of the images may be used.

In the loop, a certain center shift amount is assumed, and the assumed center shift amount is corrected to generate a reconstructed image (step S5). An index is calculated based on the corrected reconstructed image (step S6). It is determined whether or not the number of steps reaches a predetermined numerical value and the loop condition is completed (step S7). If the loop condition is not completed, the process returns to step S5. When the loop condition is completed, the process proceeds to step S8. Thus, an index is obtained for each of a plurality of assumed center shift amounts.

Next, profile fitting is performed on the index values obtained for the plurality of assumed center shift amounts (step S8). The obtained profile function can be used to determine extreme values. Statistical processing or shape determination is performed on the plot of the index values (step S9). An analysis result is obtained from these processes, and the user can recognize whether the measurement time is short or not and information on the motion of the sample. The plot of the index value and the analysis result are output (step S10). Note that whether or not steps S9 and S10 are performed is arbitrary, and the steps can be performed in parallel with the following steps S11 to S15.

Next, it is determined whether or not the scanning method of the CT device 200 is a 360° scanning (step S11). When the scanning method is a 360° scan, a maximal value of the index with respect to the assumed center shift amount is searched for (step S12). If the scanning method is not a 360° scan, the scanning method is assumed to be a 180° scan, and a minimal value of the index with respect to the assumed center shift amount is searched for (step S13). Note that, instead of the determination as to whether the scan is a 360° scan or not, the determination as to whether the scan is a 180° scan or not may be performed.

The center shift amount with respect to the extreme value searched in this manner can be specified as the actual center shift amount (step S14). A reconstructed image is generated by correcting the measurement data with the actual center shift amount obtained, and output (step S15). Thus, the quality of the reconstructed image can be improved.

[Estimate According to Scanning Method]

The processing apparatus 300 acquires information of the scanning method as device information from the CT device 200. When the scanning method is a 360° scan, a maximal value of the index representing the variation of the pixel values is searched to specify the center shift amount. On the other hand, when the scanning method is a 180° scan, a minimal value of the index representing the variation of the pixel values is searched to specify the center shift amount.

[Set Region of Interest]

Figure 9:
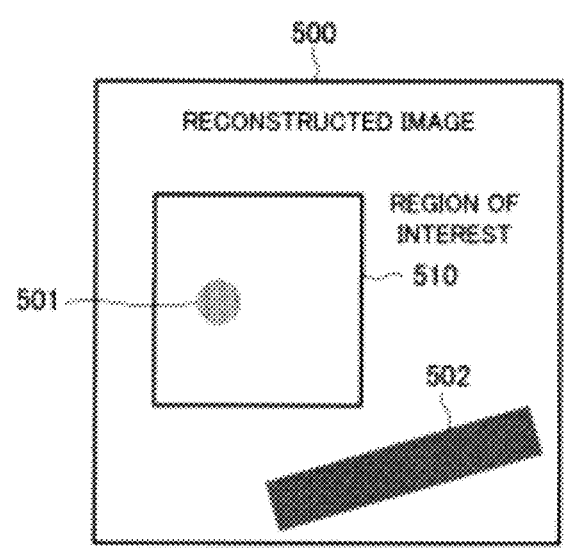
FIG. 9 is a diagram schematically showing an example of a reconstructed image generated from an original measurement data.

FIG. 9 expresses an example schematically showing a reconstructed image 500 generated directly from the measurement data. Reconstructed image 500 shown in FIG. 9 shows a cross section perpendicular to the z-axis (rotation axis). For this cross sectional image, the user can specify a rectangular region of interest 510. Thus, the region of interest 510 can be specified by inputting an area for a certain z-axis cross section. At the time, the region of interest 510 includes an image 501 of the characteristic structure from which information is desired to be extracted, and the region of interest 510 is set so that an image 502 of the structure made of a metal material or the like is removed from the region of interest 510.

Figure 10:
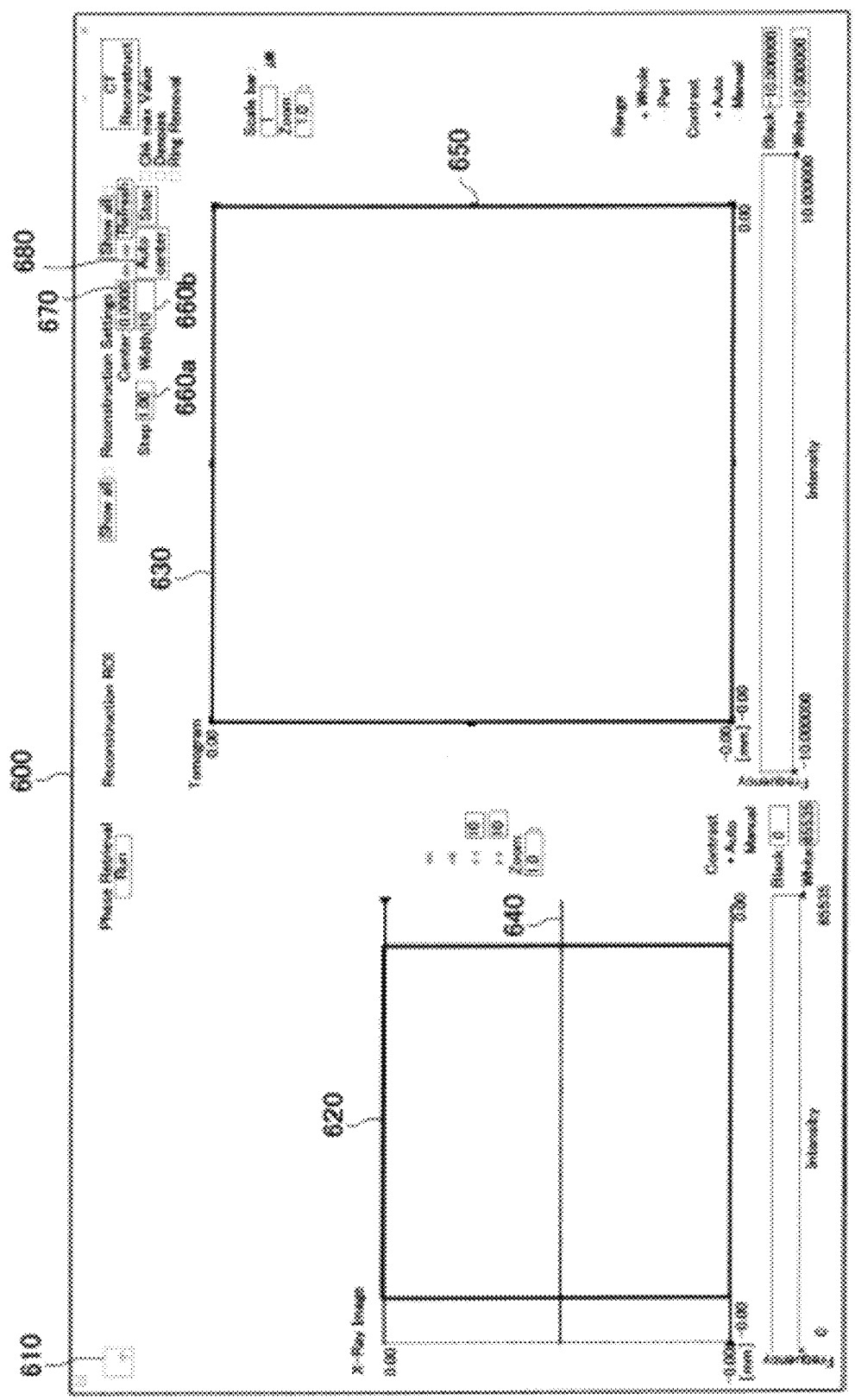
FIG. 10 is a diagram showing an example of a display screen at a time of correction.

FIG. 10 expresses an example showing a display screen 600 at the time of correction. The button 610 is a button for instructing acquisition of measurement data. For example, when the button 610 is clicked, a window listing the measurement data files can be displayed so that a specific file can be specified from the window. The image 620 is a projected image obtained from the measurement data. The image 630 is a reconstructed image obtained from the measurement data.

The user can specify the position of the line 640 on the image 620 to specify a cross section perpendicular to the z-axis of the reconstructed image. Further, the user can move the position of the boundary 650 on the image 630 to specify the region of interest as the xy region on the z-axis cross section of the reconstructed image. An index may be obtained for the two-dimensional region on the reconstructed image.

The display frames 660a and 660b respectively indicate the number of steps and the step width in changing and assuming the center shift as the loop condition of the processing. Further, the display frame 670 is used for inputting the center of the search range before the start of the processing, and displays the specified actual center shift amount after the extreme value search is completed. Auto-Center button 680 is a button for instructing the execution of the index analysis.

[Indication of Modification of Measurement and Analysis Conditions]

The processing apparatus 300 may display a plot of the index versus the assumed center shift amount. The plot of the index against the center shift amount can be applied to the evaluation for the appropriateness of the original measurement. The user may realize indications of modifications from the plot.

After the profile fitting is performed on the plot of index values by an appropriate function, statistical processing and shape determination can be performed. The result of statistical processing of the plot shows the variation of the index value. For example, if the variation is large, the processing apparatus 300 can indicate that the noise of the reconstructed image is large and the measurement time is short. The result of the shape determination of the plot shows how many peaks and valleys there are in the profile. For example, if there are two peaks or valleys, there are two points for extreme values, therefore the processing apparatus 300 can indicate a motion of the sample other than the center shift. If there are no peaks or valleys for extreme values, there may be no center or metal effects in the region of interest. If the analysis results show these trends, the processing apparatus 300 may offer modification of the cause.

The processing apparatus 300 may automatically indicate a modification of the measurement condition or the analysis condition from the tendency of the plot. For example, an indication that the exposure time should be extended may be displayed depending on whether or not the sum of squares of the residuals caused by fitting an appropriate function to the plot exceeds a predetermined value.

[Tilt of Rotation Axis]

The above technique is presupposed to be applied to a case that the center shift is constant along the z-axis, however, may be applied to a case where the center shift is not constant. The tilt of the rotation axis (detector) can be calculated by changing the z value to estimate the center shift amount on multiple sections. With such an assisting function, the adjustment work performed by the installation service person for half a day at the time of delivery of the CT device is shortened.

[Example 1]

Figure 11:
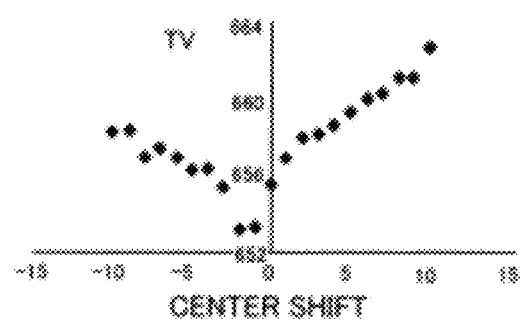
FIG. 11 is a graph showing a plot of total variation in a 180° scan measurement.

The cross section of the bamboo skewer was observed using the system 100 configured as described above. A nano3DX (registered trade mark) with 180° scan produced by Rigaku was used as the CT device 200. FIG. 11 is a graph showing a plot of total variation in a 180° scanning measurement.

Figure 12A:
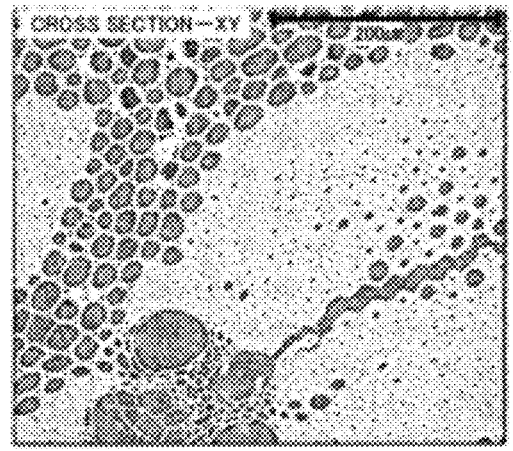
FIGS. 12A and 12B are reconstructed images of 180° scanning measurements with a z=0 cross section respectively with an assumed center shift of −1 (minimal value) and an assumed center shift of 5.
Figure 12B:
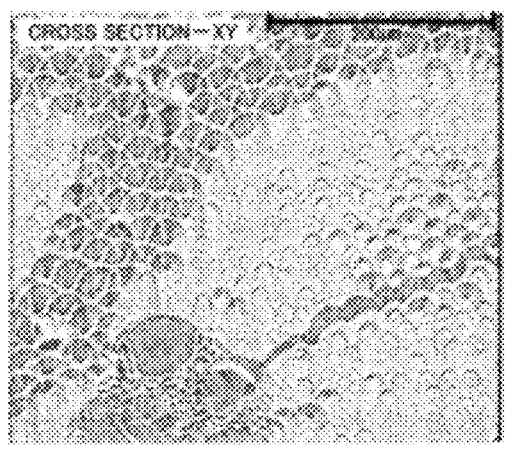

FIGS. 12A and 12B are reconstructed images of z=0 cross sections respectively with assumed center shifts of −1 (minimal value) and 5. It can be seen that bamboo cells clearly appear in the image of FIG. 12A, however, semicircular artifacts occur in the image of FIG. 12B.

[Example 2]

Figure 13A:
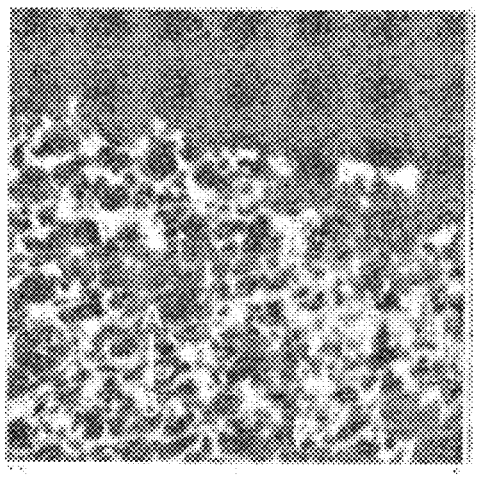
FIG. 13A, 13B are reconstructed images of 360° scanning measurements with z=0 cross section respectively with an assumed center shift of −4 (maximal value) and an assumed center shift of 0.
Figure 13B:
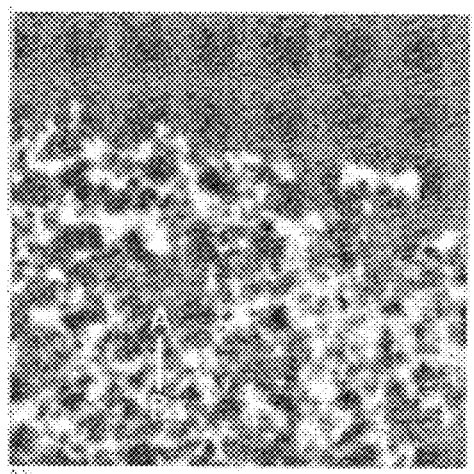
Figure 14A:
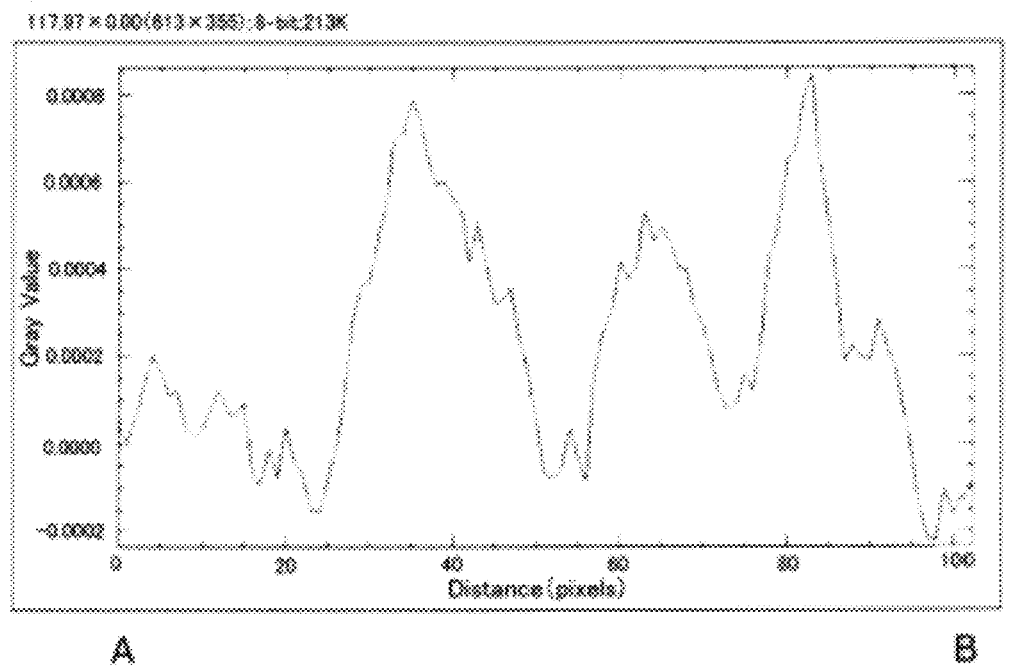
FIGS. 14A and 14B are graphs showing pixel values on A-B respectively in FIGS. 13A and 13B.
Figure 14B:
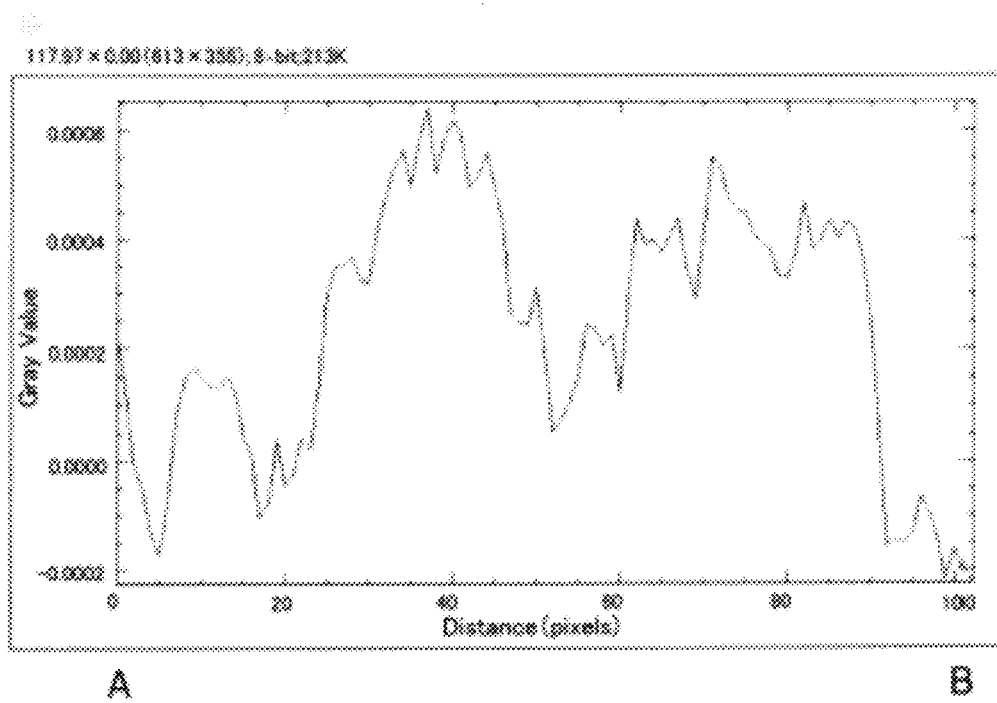

A CTLabHX with 360° scan produced by Rigaku was used as the CT device 200 to observe a bread. FIGS. 13A and 13B are reconstructed images of z=0 cross sections respectively with assumed center shift amounts of −4 (maximal value) and 0. In the image of FIG. 13A, the shape of voids in the bread is clearly seen, but in the image of FIG. 13B, the shape of voids can be seen to be obscure. FIGS. 14A and 14B are pixel values of z=0 cross sections respectively with assumed center shift amounts of −4 (maximal value) and 0. Both are obtained by outputting the pixel values of the range of A-B (100 pixels) in the FIGS. 13A and 13B. It is confirmed that FIG. 14A shows that the change of the pixel values at the boundary between the bread body and the void is clear, whereas FIG. 14B shows that the change of the pixel values at the boundary between the bread body and the void is unclear.

[Example 3]

Figure 15A:
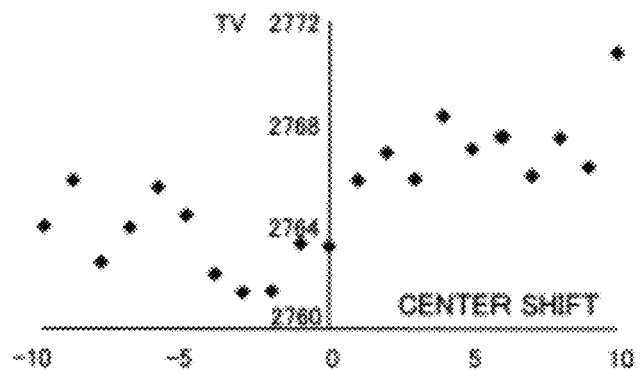
FIGS. 15A and 15B are graphs showing plots of the total variation respectively when the variation of the index values is large and when the variation of the index values is small.
Figure 15B:
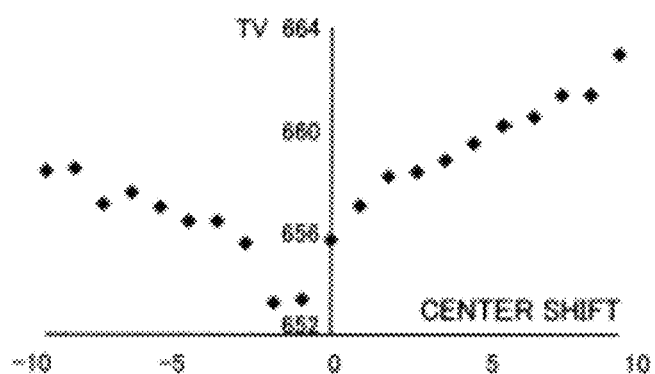

FIGS. 15A and 15B are graphs showing plots of the total variation respectively when the variation of the index values is large and when the variation of the index values is small. The total variation shown in the FIG. 15A is the result of the index analysis when measured with short exposure times, and there is not enough tendency in plotting the total variation with respect to the center shift amount. On the other hand, the total variation shown in FIG. 15B is the result of an index analysis when the measurement is performed with a long exposure time, and it is clearly seen that the minimal value occurs around the center shift amount −1 and −2 from the plot of the total variation. Thus, the index can be used for quantitative evaluation of the quality of the image. It can also be used to determine whether the exposure time is sufficient or to determine whether or not there is a motion other than the center shift.

[Summary of Examples]

Similar to the above, with nano3DX (registered trade mark) as a CT device with 180° scan produced by Rigaku, 42 measurements of automatic center shift corrections were performed, and with a CT device with 360° scan CTLabHX produced by Rigaku, 18 measurements of automatic center shift corrections were performed in the image reconstruction.

As a result, the quality of the reconstructed image was improved in all cases.

DESCRIPTION OF SYMBOLS 100 system
200 CT device
210 rotation control unit
250 sample stage
260 X-ray source
270 detector
280 drive unit
300 processing apparatus
311 measurement data storage unit
312 device information storage unit
320 reconstruction unit
330 region specifying unit
340 temporary correction unit
350 method determination unit
360 index analyzing unit
370 plot outputting unit
380 center shift amount specifying unit
390 correction unit
410 input device
420 display device
600 display screen
610 button
620,630 image
640 line
650 boundary
660a, 660b, and 670 display frames
680 AutoCenter button

What is claimed is:

1. A center shift amount estimating apparatus for estimating a deviation between a rotation axis of a sample and a center of a detector with respect to an X-ray source in a CT device, the center shift amount estimating apparatus comprising a processing circuitry configured to:

specify a region of interest in a reconstructed uncorrected image,
correct an assumed center shift amount to reconstruct a temporarily corrected image with respect to the region of interest,
correct an extreme value of an index representing variation of pixel values in the temporarily corrected image, and
specify an actual center shift amount with respect to the extreme value, wherein
a maximal value of the index is searched for in the case of a 360° scan, and a minimal value of the index is searched for in the case of a 180° scan.

2. The center shift amount estimating apparatus according to claim 1,
wherein the region specifying unit specifies the region of interest based on a user specification.

3. The center shift amount estimating apparatus according to claim 2,
wherein the region of interest is a two-dimensional region on a cross section perpendicular to the rotation axis.

4. The center shift amount estimating apparatus according to claim 1, further comprising:
a method determination unit for determining a scanning method of the CT device,
wherein the index analyzing unit searches for a maximal value or a minimal value of the index according to the determined scanning method.

5. The center shift amount estimating apparatus according to claim 4,
wherein the method determination unit determines the scanning method of the CT device from information received from the CT device.

6. The center shift amount estimating apparatus according to claim 1,
wherein the index analyzing unit performs statistical processing or shape determination on a plot of the index with respect to the assumed center shift amount.

7. The center shift amount estimating apparatus according to claim 1, further comprising:
a plot outputting unit for outputting a plot of the index with respect to the assumed center shift amount.

8. The center shift amount estimating apparatus according to claim 1, further comprising:
a correction unit for correcting the actual center shift amount to reconstruct a corrected image.

9. A center shift amount estimating method for estimating a deviation between a rotation axis of a sample and a center of a detector with respect to an X-ray source in a CT device, the center shift amount estimating method comprising:
specifying a region of interest in a reconstructed uncorrected image,
correcting an assumed center shift amount to reconstruct a temporarily corrected image with respect to the region of interest,
searching an extreme value of an index representing variation of pixel values in the temporarily corrected image, and
specifying an actual center shift amount with respect to the extreme value, wherein
a maximal value of the index is searched for in the case of a 360° scan, and a minimal value of the index is searched for in the case of a 180° scan.

10. A non-transitory computer readable recording medium having recorded thereon a center shift amount estimating program for estimating a deviation between a rotation axis of a sample and a center of a detector with respect to an X-ray source in a CT device, the program causing a computer to execute the processes of:
  specifying a region of interest in a reconstructed uncorrected image,
  correcting an assumed center shift amount to reconstruct a temporarily corrected image with respect to the region of interest,
  searching an extreme value of an index representing variation of pixel values in the temporarily corrected image, and
  specifying an actual center shift amount with respect to the extreme value, wherein
  a maximal value of the index is searched for in the case of a 360° scan, and a minimal value of the index is searched for in the case of a 180° scan.

* * * * *